United States Patent
Asao et al.

(10) Patent No.: US 8,163,360 B2
(45) Date of Patent: Apr. 24, 2012

(54) PIGMENT DISPERSION AND INKJET RECORDING MEDIUM USING THE SAME

(75) Inventors: Masaya Asao, Yokohama (JP); Kenji Nakajima, Machida (JP); Sadayuki Sugama, Tsukuba (JP); Hitoshi Yoshino, Zama (JP); Akira Nagashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 12/445,550

(22) PCT Filed: Dec. 25, 2008

(86) PCT No.: PCT/JP2008/073922
§ 371 (c)(1),
(2), (4) Date: Apr. 14, 2009

(87) PCT Pub. No.: WO2009/084710
PCT Pub. Date: Jul. 9, 2009

(65) Prior Publication Data
US 2010/0183828 A1      Jul. 22, 2010

(30) Foreign Application Priority Data
Dec. 28, 2007   (JP) ................. 2007-340899

(51) Int. Cl.
*B41M 5/40* (2006.01)
(52) U.S. Cl. ........... 428/32.28; 428/32.3; 428/32.34; 428/32.36
(58) Field of Classification Search ......... 428/32.28, 428/32.3, 32.34, 32.36
See application file for complete search history.

(56) References Cited

U.S. PATENT DOCUMENTS

| | | | |
|---|---|---|---|
| 4,202,870 A | 5/1980 | Weber et al. | 423/630 |
| 4,242,271 A | 12/1980 | Weber et al. | 260/448 AD |
| 4,248,852 A | 2/1981 | Wakabayashi et al. | 423/626 |
| 4,892,591 A | 1/1990 | Ogawa et al. | 106/482 |
| 5,041,328 A | 8/1991 | Akiya et al. | 428/212 |
| 5,078,790 A | 1/1992 | Tochihara et al. | 106/20 |
| 5,080,716 A | 1/1992 | Aoki et al. | 106/20 |
| 5,131,949 A | 7/1992 | Tochihara et al. | 106/20 |
| 5,132,700 A | 7/1992 | Tochihara et al. | 346/1.1 |
| 5,213,613 A | 5/1993 | Nagashima et al. | 106/20 R |
| 5,258,066 A | 11/1993 | Kobayashi et al. | 106/22 R |
| 5,296,022 A | 3/1994 | Kobayashi et al. | 106/20 D |

(Continued)

FOREIGN PATENT DOCUMENTS

EP    0 701 904 A1    3/1996

(Continued)

OTHER PUBLICATIONS

International Preliminary Report on Patentability and the Written Opinion of the International Searching Authority of International Application No. PCT/JP2008/073922 dated Dec. 25, 2008.

(Continued)

*Primary Examiner* — Betelhem Shewareged
(74) *Attorney, Agent, or Firm* — Fitzpatrick, Cella, Harper & Scinto

(57) ABSTRACT

The present invention relates to a pigment dispersion having an inorganic pigment dispersed therein, characterized in that a metal compound adheres to the inorganic pigment and a metal ion concentration of the metal compound in the pigment dispersion does not exceed 0.05 mol/L.

6 Claims, 4 Drawing Sheets

U.S. PATENT DOCUMENTS

| | | | |
|---|---|---|---|
| 5,409,529 A | 4/1995 | Nagashima et al. | 106/22 H |
| 5,451,251 A | 9/1995 | Mafune et al. | 106/22 H |
| 5,478,383 A | 12/1995 | Nagashima et al. | 106/22 H |
| 5,482,545 A | 1/1996 | Aoki et al. | 106/22 K |
| 5,571,313 A | 11/1996 | Mafune et al. | 106/22 H |
| 5,635,291 A | 6/1997 | Yoshino et al. | 428/304.4 |
| 5,679,451 A | 10/1997 | Kondo et al. | 428/304.4 |
| 5,707,716 A | 1/1998 | Yoshino et al. | 428/212 |
| 5,733,363 A | 3/1998 | Nagashima et al. | 106/31.43 |
| 5,738,932 A | 4/1998 | Kondo et al. | 428/195 |
| 5,800,916 A | 9/1998 | Yoshino et al. | 428/328 |
| 5,804,320 A | 9/1998 | Tomioka et al. | 428/478.2 |
| 5,846,647 A | 12/1998 | Yoshino et al. | 428/328 |
| 5,851,654 A | 12/1998 | Yoshino et al. | 428/328 |
| 5,865,883 A | 2/1999 | Teraoka et al. | 106/31.32 |
| 5,869,177 A | 2/1999 | Yoshino et al. | 428/328 |
| 5,936,649 A | 8/1999 | Ikeda et al. | 347/87 |
| 5,955,142 A | 9/1999 | Yoshino et al. | 427/205 |
| 5,955,185 A | 9/1999 | Yoshino et al. | 428/304.4 |
| 5,962,124 A | 10/1999 | Yoshino et al. | 428/328 |
| 5,965,252 A | 10/1999 | Santo et al. | 428/329 |
| 6,000,794 A | 12/1999 | Kondo et al. | 347/105 |
| 6,156,419 A | 12/2000 | Brugger et al. | 428/304.4 |
| 6,177,188 B1 | 1/2001 | Ichioka et al. | 428/342 |
| 6,342,289 B1 | 1/2002 | Eguchi et al. | 428/195 |
| 6,344,262 B1 | 2/2002 | Suzuki | 428/195 |
| 6,387,168 B1 | 5/2002 | Koitabashi et al. | 106/31.6 |
| 6,391,440 B1 | 5/2002 | Yoshino et al. | 428/342 |
| 6,558,740 B1 | 5/2003 | Santo et al. | 427/146 |
| 6,576,324 B2 | 6/2003 | Yoshino et al. | 428/195 |
| 6,649,661 B2 | 11/2003 | Yoshino et al. | 516/93 |
| 6,676,254 B2 | 1/2004 | Nagashima et al. | 347/100 |
| 6,706,340 B2 | 3/2004 | Yoshino et al. | 428/32.21 |
| 6,716,495 B1 | 4/2004 | Yoshino et al. | 428/32.16 |
| 6,720,041 B2 | 4/2004 | Yoshino et al. | 428/32.24 |
| 6,945,646 B2 | 9/2005 | Ogino et al. | 347/105 |
| 7,125,111 B2 | 10/2006 | Udagawa et al. | 347/100 |
| 7,128,779 B2 | 10/2006 | Osumi et al. | 106/31.52 |
| 7,141,105 B2 | 11/2006 | Udagawa et al. | 106/31.49 |
| 7,144,449 B2 | 12/2006 | Udagawa et al. | 106/31.15 |
| 7,144,613 B2 | 12/2006 | Eguchi et al. | 428/32.37 |
| 7,185,978 B2 | 3/2007 | Nagashima et al. | 347/100 |
| 7,195,340 B2 | 3/2007 | Nagashima et al. | 347/56 |
| 7,195,665 B2 | 3/2007 | Osumi et al. | 106/31.47 |
| 7,267,716 B2 | 9/2007 | Nagashima et al. | 106/31.6 |
| 7,276,110 B2 | 10/2007 | Tsujimura et al. | 106/31.27 |
| 7,276,112 B2 | 10/2007 | Tokuda et al. | 106/31.6 |
| 7,282,090 B2 | 10/2007 | Osumi et al. | 106/31.47 |
| 7,291,211 B2 | 11/2007 | Kaneko et al. | 106/31.27 |
| 7,297,199 B2 | 11/2007 | Osumi et al. | 106/31.5 |
| 7,297,203 B2 | 11/2007 | Takada et al. | 106/31.8 |
| 7,303,620 B2 | 12/2007 | Nagashima et al. | 106/31.6 |
| 7,347,890 B2 | 3/2008 | Nito et al. | 106/31.27 |
| 7,364,770 B2 | 4/2008 | Nagashima et al. | 427/215 |
| 7,374,606 B2 | 5/2008 | Sato et al. | 106/31.27 |
| 7,377,631 B2 | 5/2008 | Takada et al. | 347/100 |
| 7,402,200 B2 | 7/2008 | Imai et al. | 106/31.27 |
| 7,416,639 B2 | 8/2008 | Yoshino et al. | 162/181.4 |
| 7,429,291 B2 | 9/2008 | Udagawa et al. | 106/31.15 |
| 7,445,325 B2 | 11/2008 | Aikawa et al. | 347/100 |
| 7,455,400 B2 | 11/2008 | Nagashima et al. | 347/100 |
| 7,464,965 B2 | 12/2008 | Udagawa et al. | 283/92 |
| 7,473,437 B2 | 1/2009 | Nagashima et al. | 427/261 |
| 7,578,876 B2 | 8/2009 | Nakajima et al. | 106/31.65 |
| 2004/0161554 A1* | 8/2004 | Suda et al. | 428/32.1 |
| 2005/0204955 A1 | 9/2005 | Nagashima et al. | 106/31.59 |
| 2006/0078697 A1 | 4/2006 | Yoshino | 428/32.34 |
| 2006/0098068 A1 | 5/2006 | Hakamada et al. | 347/100 |
| 2006/0103704 A1 | 5/2006 | Hakamada et al. | 347/100 |
| 2006/0194897 A1 | 8/2006 | Kawabe et al. | 523/160 |
| 2007/0013761 A1 | 1/2007 | Yoshino et al. | 347/105 |
| 2009/0078889 A1 | 3/2009 | Udagawa et al. | 250/492.1 |
| 2010/0183828 A1* | 7/2010 | Asao et al. | |

FOREIGN PATENT DOCUMENTS

| | | |
|---|---|---|
| JP | 57-44605 | 9/1982 |
| JP | 61-57380 | 3/1986 |
| JP | 63-166586 | 7/1988 |
| JP | 63-306074 | 12/1988 |
| JP | 1-259982 | 10/1989 |
| JP | 7-232473 | 9/1995 |
| JP | 8-132731 | 5/1996 |
| JP | 8-164664 | 6/1996 |
| JP | 9-66664 | 3/1997 |
| JP | 9-76628 | 3/1997 |
| JP | 10-329404 | 12/1998 |
| JP | 2000-177235 | 6/2000 |
| JP | 2002-179961 | 6/2002 |

OTHER PUBLICATIONS

International Search Report of International Application No. PCT/JP2008/073922 dated Dec. 25, 2008.

Jul. 8, 2010 International Preliminary Report on Patentability and Apr. 21, 2009 Written Opinion in International Application No. PCT/JP2008/073922.

\* cited by examiner (8-1)

(8-2)

PIGMENT DISPERSION AND INKJET RECORDING MEDIUM USING THE SAME

TECHNICAL FIELD

The present invention relates to an inkjet recording medium suitable for recording using aqueous ink, and the present invention particularly relates to an inkjet recording medium excellent in color developability and image fastness property and to a pigment dispersion for the recording medium.

BACKGROUND ART

Particularly in the recent inkjet recording mediums widely distributed in the market, various technical approaches and proposals have been disclosed for the purpose of improving color developability and image fastness property at least to the same level as those of silver halide photography. Of them, there are many proposals for improving the image fastness property of recorded images by making metal ions and metal salts co-existent in addition to an ink-receiving material in an ink-receiving layer.

For example, Japanese Patent Application Laid-Open No. 2000-177235 discloses a recording sheet, in which a water-soluble metal salt or a hardly-soluble metal compound is simply added to an ink-receiving layer containing alumina hydrate in order to ensure gas resistance, light resistance, high ink absorbency, high ink fixability, high optical density and others of a recorded image. Furthermore, Japanese Patent Application Laid-Open No. S61-057380 discloses a recording sheet containing a porous inorganic pigment, a cationic resin and a magnesium compound having a water solubility of 1% or less at normal temperature in order to ensure water resistance, light resistance and high optical density.

Furthermore, as a recording medium using silica as an ink-receiving material, a recording medium using silica whose surface is treated with a compound or salt of monovalent or more metal ion has been proposed in order to improve the image fastness property of a recording image. Japanese Patent Application Laid-Open No. S63-166586 discloses a recording material containing silica whose surface is treated with a metal soap, a hydroxide, a salt and an oxide of a metal in order to improve color developability, light resistance and water resistance. This patent document discloses a method of treating the surface of silica, for example, by adding a metal salt during synthesis of silica under heating conditions of 90° C. and aging for 20 minutes. In short, timing of adding a metal compound for the surface treatment is disclosed. Furthermore, Japanese Patent Application Laid-Open No. H01-259982 proposes an inkjet recording sheet using silica whose surface is treated with calcium, magnesium and/or barium in order to improve light resistance. This document discloses, as a method of treating the surface of silica, a method of adding a metal salt to an aqueous solution having silica dispersed therein and heating the solution to 90° C. Furthermore, Japanese Patent Application Laid-Open No. H10-329404 proposes an inkjet recording medium containing a mixture of a porous aluminum oxide and a compound having a rare-earth metal series element of the periodical system and having an atomic number of 57 to 71 in an ink-receiving layer. The patent document discloses, as a method of treating the surface of a porous aluminum oxide, a method of adding a metal salt to an aqueous solution having the porous aluminum oxide dispersed therein and heating to 90° C.

DISCLOSURE OF THE INVENTION

The present inventors have reviewed these conventional technologies. As a result, they found that it is difficult to obtain an advantageous effect of achieving sufficient image fastness property while maintaining high optical density.

As to the recording medium described in Japanese Patent Application Laid-Open No. 2000-177235, the following were found. Since the medium is simply impregnated with a water-soluble metal salt or the medium has a water-soluble metal salt dispersed therein, the water-soluble metal salt does not remain in the surface of an ink-receiving layer when printed, and permeates into the interior of the ink-receiving layer together with the solution. Because of this, gas resistance and light resistance are only improved slightly. Nothing was found about high optical density. Furthermore, it was found that, as to the compounds containing elements belonging to the groups IIA and IIIA in the periodical table of element, since pigment dispersions containing these compounds become easily gelatinized, the compounds can be added but only slightly.

In the recording medium described in Japanese Patent Application Laid-Open No. S61-057380 in which a magnesium compound having a water solubility of 1% or less at normal temperature is added in a pigment dispersion, the effects of gas resistance and light resistance can be confirmed but insufficient. This is conceivable as follows. Dye is not always present in the proximity of magnesium compound particles when printed, and therefore, effects due to the addition of the magnesium compound cannot be sufficiently obtained. In addition, acid sites are present on the surface of an inorganic pigment such as silica and alumina. The strength of solid acid depending upon the acid sites conceivably has a correlation with gas resistance and light resistance of ink. However, in this method, it seems to be difficult to reduce the strength of solid acid.

In the surface treatment methods disclosed in Japanese Patent Applications Laid-Open No. S63-166586, No. H01-259982 and No. H10-329404, since a metal is present in a state where it is easily dissolved in water, a metal elutes from a pigment dispersion so that the viscosity of the pigment dispersion may easily increase, which is a problem.

It is an object of the present invention to provide an inkjet recording medium capable of attaining excellent gas resistance and light resistance, and high optical density over the conventional technologies disclosed above and a pigment dispersion for preparing the medium.

The present invention is directed to a pigment dispersion comprising an inorganic pigment dispersed therein, characterized in that a metal compound adheres to the inorganic pigment and the concentration of the metal ion of the metal compound in the pigment dispersion does not exceed 0.05 mol/L. The phrase "the concentration of the metal ion does not exceed 0.05 mol/L" includes the case where the metal compound is not dissolved in the pigment dispersion.

The present invention is also directed to an inkjet jet recording medium comprising an ink-receiving layer, characterized in that the ink-receiving layer is formed by applying the aforementioned pigment dispersion to a substrate.

According to the present invention, it is possible to provide an inkjet recording medium achieving excellent gas resistance and light resistance and high optical density, and provide a pigment dispersion for preparing such an inkjet recording medium.

Further features of the present invention will become apparent from the following description of exemplary embodiments with reference to the attached drawings.

BRIEF DESCRIPTION OF THE DRAWINGS

FIG. 3 is a graph showing the measurement results of mass spectrum (m/z=16) derived from ammonia obtained in the temperature-programmed desorption (TPD) test using ammonia, in which reference symbol a indicates a chart of alumina hydrate and reference symbol b indicates a chart of alumina hydrate which magnesium acetate 4-hydrate adheres to;

FIG. 4 is a graph showing the measurement results of mass spectrum (m/z=18) derived from water obtained in the temperature-programmed desorption (TPD) test using ammonia, in which reference symbol a indicates a chart of alumina hydrate and reference symbol b indicates a chart of alumina hydrate which magnesium acetate 4-hydrate adheres to;

BEST MODES FOR CARRYING OUT THE INVENTION

The present invention will be more specifically described with reference to exemplary embodiments below.

The present inventors have predicted a mechanism as to how a coloring material dyed onto an inorganic pigment deteriorates with gas, as described below. The mechanism they have predicted will be described with reference to the accompanying drawings below.

Figure 1:
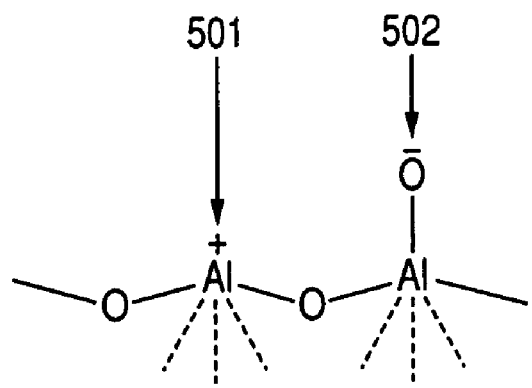
FIG. 1 is a schematic view of the surface of alumina hydrate on which attached water is not present.
Figure 2:
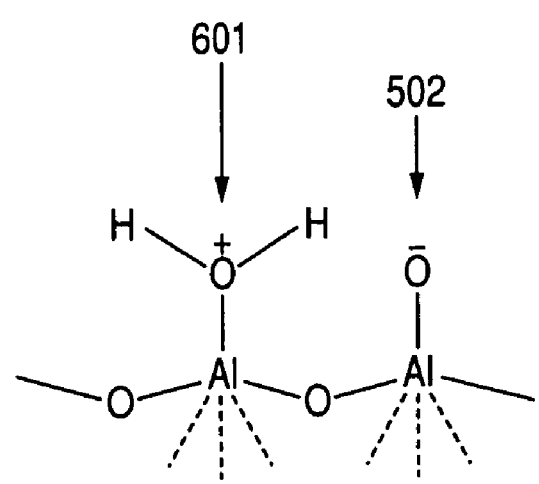
FIG. 2 is a schematic view of the surface of alumina hydrate on which attached water is present.

When attached water is not present on the surface of an inorganic pigment such as alumina hydrate and silica, Lewis acid site (501) and a base site (502) are present as shown in FIG. 1. However, when the moisture content of the air and a coloring material solution for dyeing are applied, the Lewis acid site (501) in FIG. 1 adsorbs a water molecule and changes into Broensted acid site (601) as shown in FIG. 2. When the water molecule adsorbed onto the Broensted acid sites is affected by gas such as ozone, the ozone interacts with the attached water to produce a radical. The radical exerts a strong oxidative action on the coloring material dyed on the inorganic pigment surface such as alumina hydrate and silica. As a result, the coloring material is decomposed. In short, the coloring material deteriorates.

Next, based on the aforementioned prediction, in order to suppress decomposition of the coloring material, intensive studies have been conducted with a view toward suppressing the attached water molecule or crystal water molecule, which is present on the surface of an inorganic pigment such as alumina hydrate or silica or present between the crystalline layers, from changing into active oxygen or a hydroxyl radical.

Then, the present inventors have thought it important to prevent a radical generation reaction from taking place due to the interaction between the water molecule attached to an acid site on the surface of the inorganic pigment and ozone gas. That is, to improve gas resistance of a coloring material adsorbed onto an inorganic pigment such as alumina hydrate and silica, which is used as a coloring material receptor of a recording medium for a photographic printing such as inkjet recording and exhibits a high color developability, they have intensively studied on a means for shielding a reaction point on the surface of the inorganic pigment. More specifically, they have studied the possibility such that a compound which is able to incorporate or capture the water attached on the surface of an inorganic pigment such as alumina hydrate and silica is allowed to present on the surface of an inorganic pigment such as alumina hydrate and silica.

As a result, they found that gas resistance is improved by making a metal compound adhere to the surface of an inorganic pigment having an acid function such as alumina hydrate or silica. Note that the surface of an inorganic pigment such as alumina hydrate and silica includes not only the surface of an inorganic pigment but also the inner-wall surface of holes of an inorganic pigment made porous.

The metal compound used herein is preferably a compound having no acid function, more preferably, a compound capable of incorporating or capturing water attached on the surface of an inorganic pigment, and particularly preferably, a compound containing at least one element selected from the group consisting of Mg, Ca, Sr and Ba. The gas resistance can be dramatically improved by use of these compounds.

Figure 3:
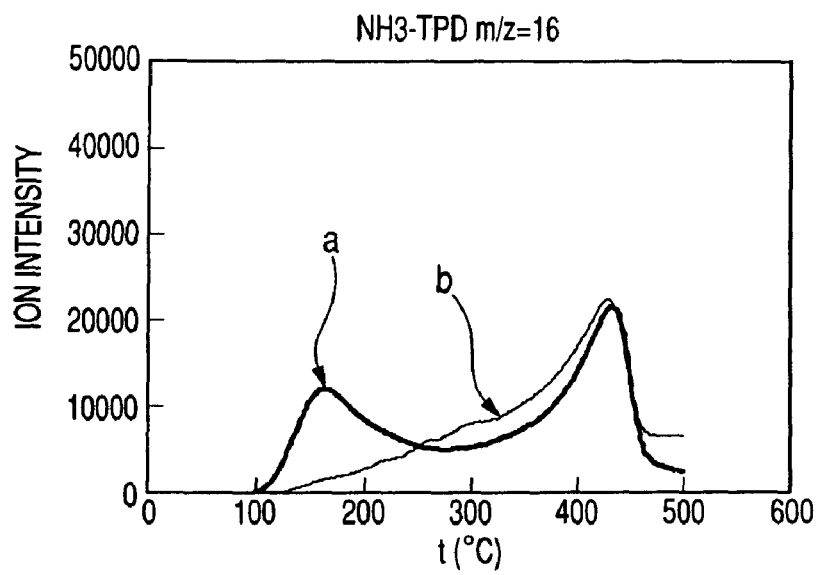
Figure 4:
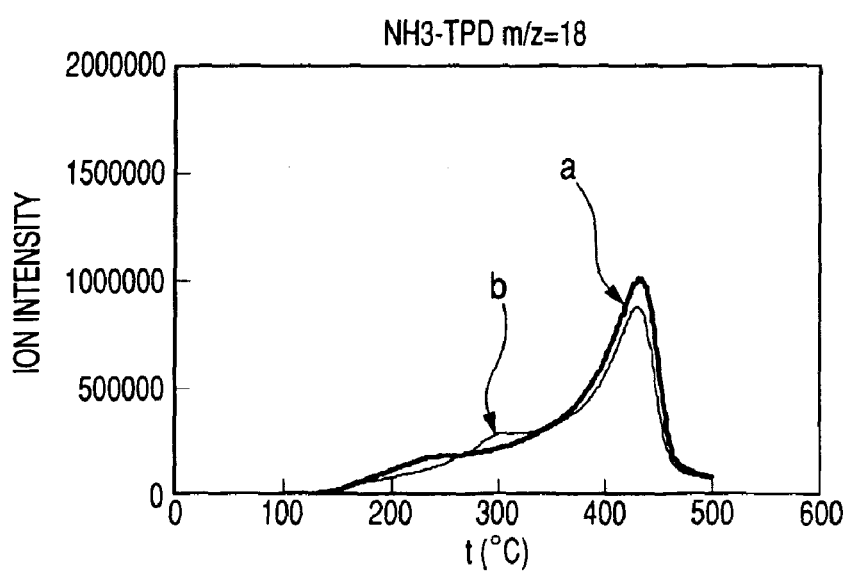

Furthermore, in the present invention, the state of an inorganic pigment showing no acid function refers to the properties of an inorganic pigment such that the acid sites on the inorganic pigment are apparently eliminated when a metal compound adheres to the inorganic pigment and the inorganic pigment behaves as if it lost its own acid function. The acid function of the inorganic pigment surface can be assessed by making use of a gas adsorption method such as temperature-programmed desorption test (TPD measurement). For example, the measurement results of the temperature-programmed desorption (TPD) test using ammonia are shown in FIG. 3 and FIG. 4. FIG. 3 shows the measurement data of the mass spectrum (m/z=16) derived from ammonia in which reference symbol a shows a chart of alumina hydrate and reference symbol b shows a chart of alumina hydrate which magnesium acetate 4-hydrate adheres to. A difference is seen between a and b at a temperature (t) of a little less than about 200° C. The peak at a temperature (t) of a little less than about 200° C. conceivably shows ammonia physically adsorbed. Since ammonia physically adsorbed is not confirmed in the case of b corresponding to the present invention, it is estimated that activity of acid causing physical adsorption of ammonia molecules, is reduced. Based on this, it is considered that the acid sites of the alumina hydrate which magnesium acetate 4-hydrate adheres to are collapsed by the magnesium acetate 4-hydrate, so that the acid function of the alumina hydrate surface decreases. Furthermore, a peak was observed at a temperature (t) of a little more than about 400° C. both in chart a and chart b. However, the peak corresponds to that shown in FIG. 4, which shows the behavior of the mass spectrum (m/z=18) derived from water and thus the peak is conceivably due to dehydration associated with crystal structure change from alumina hydrate to γ-alumina.

Figure 5:
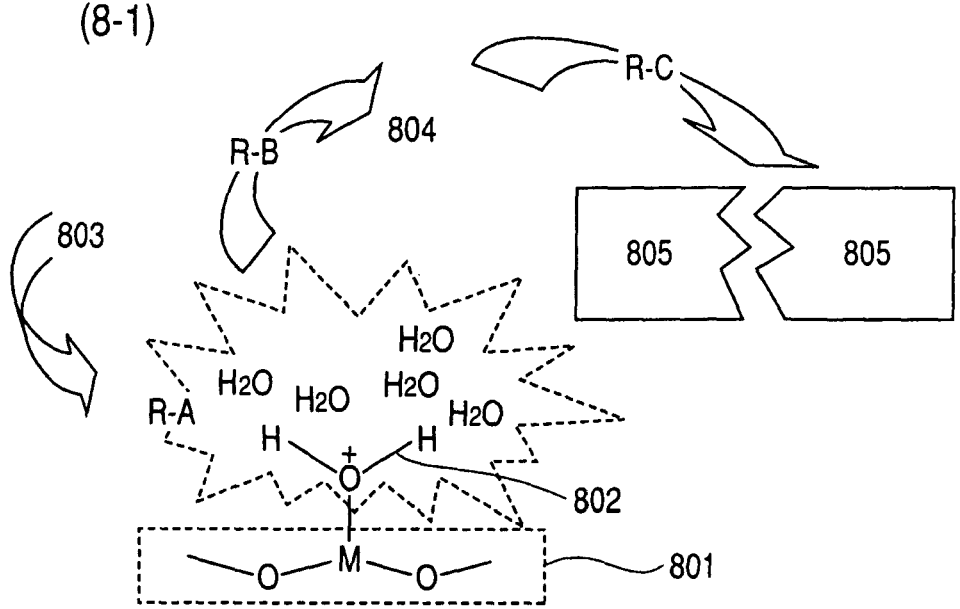
FIG. 5 is a schematic view showing an image of the mechanism of the present invention. (8-1) shows the surface state of an inorganic pigment which a metal compound does not adhere to when ozone gas is made to act thereon, while (8-2) shows the surface state of an inorganic pigment which a metal compound adheres to when ozone gas is made to act thereon.
Figure 5:
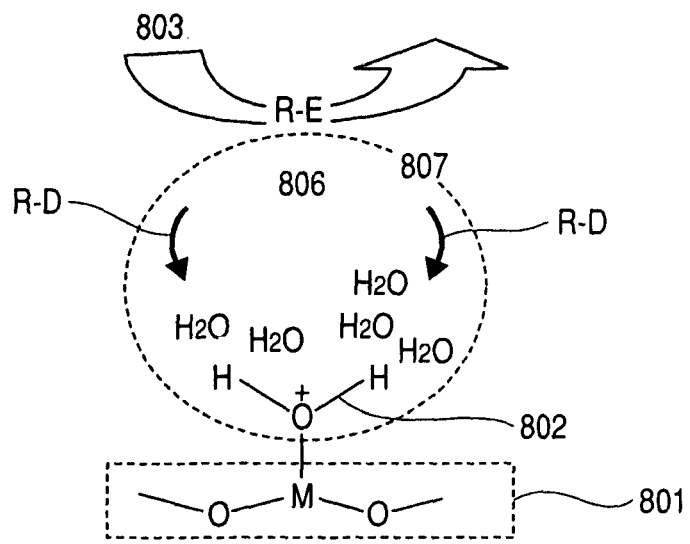

FIG. 5 shows an image of the mechanism of the present invention. (8-1) shows the case where an inorganic pigment which a metal compound adheres to is used and a water molecule (802) is attached or adsorbed to acid sites present on the surface of an inorganic pigment (801). When the water molecule (802) reacts with ozone gas (803) (R-A), a radical (804) generates (R-B) and attacks an organic substance (805) to decompose the organic substance (805) (R—C). In contrast, (8-2) shows the case of the present invention where an inorganic pigment which a metal compound adheres to is used. At the acid sites present on the surface of an inorganic pigment (801), a water molecule (802) is attached or adsorbed. The water molecule (802) is incorporated or captured (R-D) by a metal compound (806) to form a hydrate (807). Since the water molecule (802) present on the surface of the inorganic pigment (801) is stabilized in this way, the water molecule does not react with ozone gas (803) (R-E) if supplied and a radical (804) does not generate. Therefore, it is considered that organic substances tend to be less decomposed.

It was found that the inorganic pigment which a metal compound adheres to is also effective in view of light resistance.

As a metal constituting the metal compound, an alkaline earth metal such as Mg, Ca, Sr and Ba is preferred. These metals may be used as salts with organic acid ions such as acetate ion and oxalate ion or with inorganic acid ions such as sulfate ion, nitrate ion, carbonate ion, halogen ion and hydroxide ion; or as oxides thereof. The gas resistance and light resistance can be dramatically improved by making these compounds adhere to an inorganic pigment.

Generally, a dispersant is used to uniformly disperse an inorganic pigment in a solvent such as water. For example, alumina hydrate can be dispersed uniformly in water when acetic acid is used as a dispersant. This is because the surface of alumina hydrate is positively charged. Acetate ion can be adsorbed onto the surface of alumina to form an electric double layer on the surface of alumina hydrate particle. In this manner, electric repulsiveforce functions between alumina hydrate particles to prevent coagulation. However, when Mg, Ca, Sr or Ba ions are present in the solution, the electric double layer on the surface of the alumina hydrate particle is broken, electric repulsive force between particles does not work sufficiently and coagulation may occur. Because of this, alumina hydrate particles dispersed are coagulated tightly and thus the viscosity of the pigment dispersion tends to increase. Furthermore, when the dispersion is applied to a substrate for inkjet recording or a recording medium, the coating properties decrease due to high viscosity. In addition, it becomes difficult to stably form a coating layer. Further, when it is used as an ink-receiving layer, the haze of the ink-receiving layer increases (transparency decreases) and the optical density decreases.

Then, in the present invention, it is essential that a metal compound is not dissolved in a pigment dispersion or that the concentration of a metal ion of a metal compound dissolved in a pigment dispersion is not beyond 0.05 mol/L. Preferably, the concentration of the metal ion is 0 mol/L or more and 0.03 mol/L or less. In this way, a recording medium having a high optical density can be manufactured without increasing the viscosity of the pigment dispersion.

Pigment dispersions having different metal ion concentrations were prepared by use of magnesium acetate 4-hydrate or calcium acetate monohydrate as metal compounds and alumina hydrate as an inorganic pigment, and then, an average diameter of the dispersion particles of the inorganic pigment contained in each of these pigment dispersions was checked.

Figure 6:
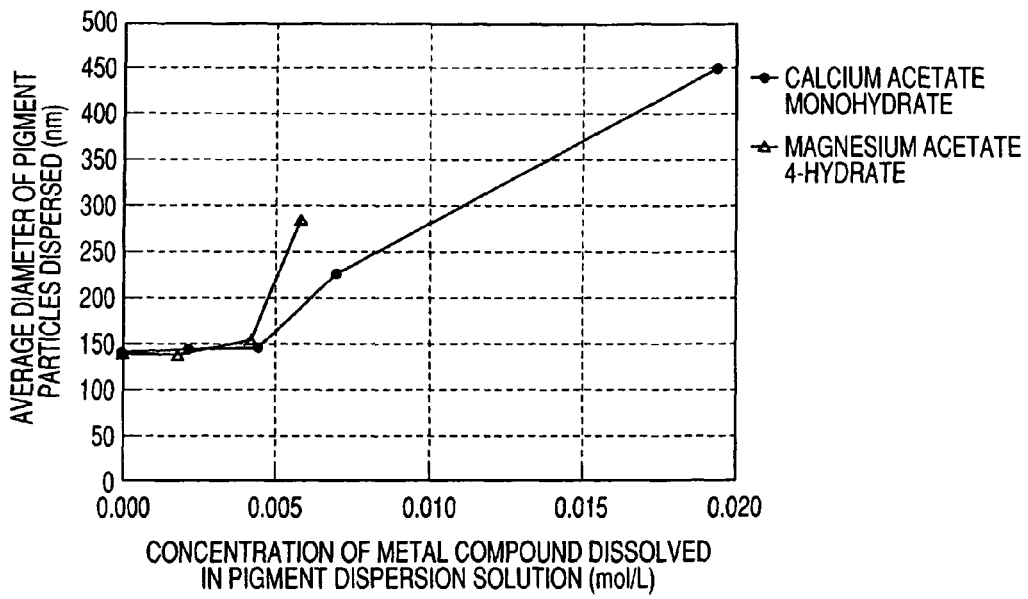
FIG. 6 is a graph showing the relationship between a concentration of metal ion in a pigment dispersion in which a metal compound is dissolved and present and an average diameter of the inorganic pigment particles dispersed in the pigment dispersion.

The results are shown in FIG. 6. Note that pure water is used as a dispersion medium. Other than the aforementioned components, acetic acid is used as a deflocculation agent to disperse the alumina hydrate. From FIG. 6, it was confirmed that when the concentration of a metal ion of a metal compound dissolved in a pigment dispersion is higher than 0.05 mol/L, inorganic pigment particles coagulate and the diameter of dispersion particles increases.

Figure 7:
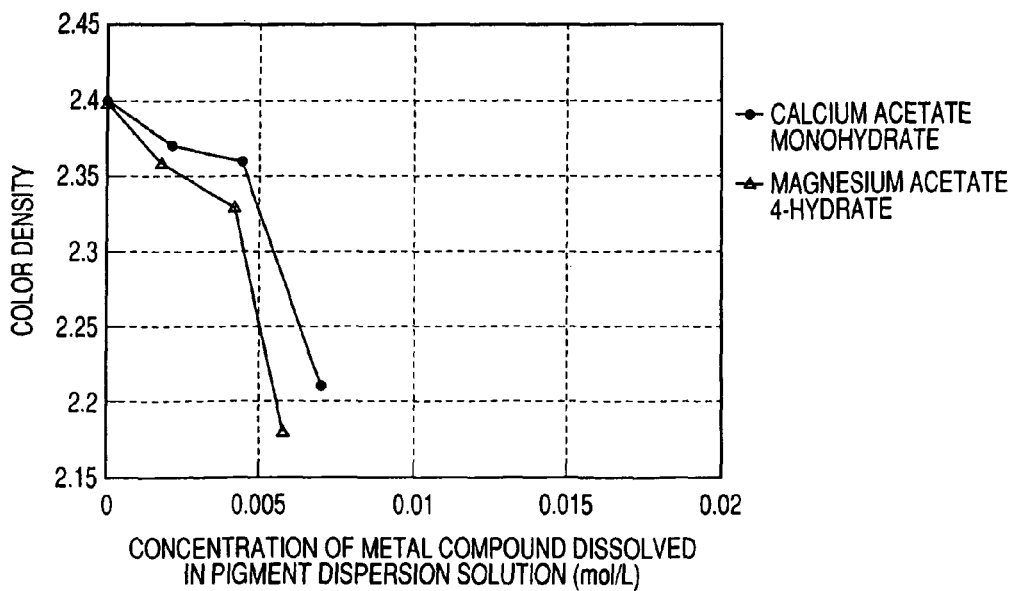
FIG. 7 is a graph showing the relationship between a concentration of metal ion in a pigment dispersion in which a metal compound is dissolved and present and an optical density of an image printed on an inkjet recording medium which is prepared by use of the pigment dispersion.

Furthermore, to the aforementioned pigment dispersion, polyvinyl alcohol as a binder was added to prepare a coating solution. Using the coating solution, an inkjet recording medium was prepared. On the recording medium, solid images of black ink were printed by a photo printer using an inkjet system. The optical density of the solid images of black ink was checked and the results are shown in FIG. 7. Note that the pigment dispersion, which dissolves a metal ion of a metal compound in a concentration of 0.15 mol/L or more, failed to form a recording medium since the viscosity was high. From FIG. 7, it was confirmed that when the concentration of metal ion of a metal compound dissolved in a pigment dispersion becomes higher than 0.05 mol/L, the optical density decreases.

As the inorganic pigment to be used in the present invention, an inorganic pigment containing alumina hydrate as a main component is preferred in view of dye fixability, transparency, optical density, color developability and glossiness; however, the inorganic pigment is not particularly limited as long as it can be used in an inkjet recording medium. Specific examples thereof may include alumina, synthetic amorphous silica, colloidal silica, zinc oxide, tin oxide, titanium oxide, zirconium oxide and compound oxides containing these. It is preferred to use a fine particle pigment having an average diameter of 1 µm or less as a main component.

The alumina hydrate preferably used in the present invention is, for example, one represented by the following general formula (I).

$$Al_2O_{3-n}(OH)_{2n} \cdot mH_2O \qquad (1)$$

where n represents 0, 1, 2 or 3; m is a value in the range of 0 to 10, preferably 0 to 5, with the proviso that m and n do not simultaneously take zero (0). Since $mH_2O$, in most cases, represents a removable water phase not involved in forming a crystal lattice, m can take a value which is an integer or not an integer. In addition, when the material of this type is heated, m may possibly reach a value of 0.

Alumina hydrate can be produced by a known method in the art. As a general example, a method of hydrolyzing aluminum alkoxide and a method of hydrolyzing sodium aluminate may be mentioned (U.S. Pat. No. 4,242,271 and No. 4,202,870). As another example, there is a method of neutralizing an aqueous solution of sodium aluminate by adding an aqueous solution such as an aqueous aluminum sulfate solution or an aqueous aluminum chloride solution (Japanese Patent Publication No. S57-44605).

In the present invention, as suitable alumina hydrate, one having a boehmite structure or an amorphous structure based on analysis of X-ray diffractometry may be preferred. In particular, alumina hydrate compounds described in publications such as Japanese Patent Applications Laid-Open No. H07-232473, No. H08-132731, No. H09-066664 and No. H09-076628 are preferred.

In the alumina hydrate, the physical properties of pores are controlled during a production process. For example, when alumina hydrate is used as an ink-receiving material, alumina hydrate preferably has a pore volume of 0.3 to 1.0 ml/g, and more preferably 0.35 to 0.9 ml/g. In addition, alumina hydrate that is preferably used has a BET specific surface area (obtained by BET method) of 50 to 350 m²/g, and more preferably 100 to 250 m²/g. The BET method is one of the surface area measurement methods for powder by a phase adsorption method. In this method, the total surface area of a sample (1 g), i.e., a specific surface area, is obtained from adsorption isotherm. Generally, as adsorption gas, nitrogen gas is frequently used and a method of measuring the adsorption amount based on change in pressure or volume of the adsorption gas is most frequently used. The most well-known equation expressing isotherm in the case of multi-molecular adsorption is the Brunauer, Emmett and Teller equation, which is called BET equation and widely used for determining specific surface areas. An adsorption amount is obtained based on the BET equation. The surface area occupied by a single adsorption molecule is multiplied by the adsorption amount to obtain a specific surface area.

In addition, the average particle diameter of alumina hydrate is preferably 1 to 100 nm, and more preferably 1 to 50 nm. The average particle diameter refers to a number average particle diameter in regard to diameters of circles having the same area as the projected area of a primary particle when the alumina hydrate is observed with an electronic microscope.

Furthermore, in the inorganic pigment to be used in the pigment dispersion of the present invention, the atomic number ratio (B/A) of a metal element (B) constituting the metal compound to a metal element (A) constituting the inorganic pigment is preferably 0.001 or more. When the ratio is smaller than 0.001, sufficient effect of gas resistance and light resistance may not be obtained. The ratio (B/A) more preferably falls within the range of 0.003 to 0.05.

The concentration of the inorganic pigment in the pigment dispersion of the present invention is preferably in the range of 5 to 30% by mass.

Next, a method of preparing an inorganic pigment which a metal compound adheres to for use in the present invention will be described by taking the case where alumina hydrate is used as an inorganic pigment as an example.

The inorganic pigment which a metal compound adheres to for use in the present invention can be prepared, for example, by a method in which hydrothermal synthetic treatment of aluminum hydroxide or alumina hydrate is performed in the presence of the metal compound. By this method, the metal compound can be incorporated into a crystalline structure while growing the crystal of the alumina hydrate and the elution of the metal compound which the inorganic pigment adheres to can be suppressed. Note that the conditions for hydrothermal synthetic treatment including temperature and pressure should be within the range where the boehmite phase is maintained stably in the phase diagram of $Al_2O_3$—$H_2O$ system. Accordingly, the temperature of the hydrothermal synthetic treatment is desirably 100° C. or more and the pressure is desirably 100 atm or less. This is because alumina hydrate is not obtained when the temperature is less than 100° C. The upper limit is not particularly limited. However, since the boehmite phase changes into an α-alumina phase when it is treated at a temperature of 350° C. or more for a long time, high temperature treatment is not preferred for producing the boehmite phase. Accordingly, the temperature is preferably 100° C. or more and less than 350° C. Furthermore, when the pressure exceeds 100 atm, particles having a fleshy, large and rough shape are obtained. The lower limit, since, needless to say, the hydrothermal system cannot be established in an open system, is preferably 10 atm or more.

The inorganic pigment which a metal compound adheres to for use in the present invention can also be prepared by a method of drying alumina hydrate in the presence of the metal compound. More specifically, alumina hydrate is blended with a metal compound, and the resultant dispersion slurry is mixed by a stirrer. In addition, if necessary, a pH adjuster such as an acid or an alkali, a dispersion stabilizer such as a nonionic surfactant or an anionic surfactant may be added. Subsequently, the mixed-state slurry is dried. As a method of drying, there are a method of using a furnace, a spray-dry method and others. Of them, the spray-dry method is more preferred since uniformly the metal compound adheres to the surface of an inorganic pigment. In the spray-dry method, the heating temperature, that is, environmental temperature (gas-phase temperature) is preferably a temperature at which the solvent used in the slurry is vaporized. When the heating temperature is 350° C. or more, the boehmite phase changes into an α-alumina phase. Therefore, high-temperature treatment is not preferred in forming the boehmite phase. Accordingly, when water is used as a solvent, the heating temperature is preferably 100 to 300° C.

The inorganic pigment which a metal compound adheres to for use in the present invention is also prepared by a method in which a solution having the metal compound dissolved therein is added to a dispersion having alumina hydrate dispersed in a solvent and the resultant is stirred and then an alkali such as ammonia water is added to effect neutralization.

The inorganic pigment to be used in the present invention, after it is prepared by the aforementioned method, is preferably washed with a solvent such as water, if necessary, to remove excessive metal compound which remains without being used for modification of the surface. By the degree of washing, the pigment dispersion can be controlled so that no metal compound is dissolved therein or so that the concentration of metal ion of a metal compound dissolved in the pigment dispersion does not exceed 0.05 mol/L.

Next, the pigment dispersion of the present invention will be described. The pigment dispersion of the present invention is a dispersion having the inorganic pigment which the aforementioned metal compound adheres to, dispersed in a dispersion medium. As a dispersion medium, water is preferred.

Generally, when an acid is used in dispersing a pigment such as the inorganic pigment which a metal compound adheres to, the pigment is easily deflocculated to yield a uniform dispersion. For the reason, an acid is preferably added to the pigment dispersion of the present invention. As an acid serving as a deflocculation agent, among commonly known acids, organic acids such as acetic acid, formic acid and oxalic acid; and inorganic acids such as nitric acid, hydrochloric acid and sulfuric acid may be mentioned.

Furthermore, the pigment dispersion of the present invention may preferably contain a binder. As the binder, those known in the art can be used, which includes polyvinyl alcohol or modified compounds thereof; starch or modified compounds thereof; gelatin or modified compounds thereof; casein or modified compounds thereof; gum Arabic; cellulose derivatives such as carboxymethylcellulose, hydroxyethylcellulose and hydroxypropylmethylcellulose; conjugate diene based copolymer latex compounds such as SBR latex, NBR latex and methyl methacrylate-butadiene copolymer; vinyl based copolymer latex compounds such as a functional group modified polymer latex and ethylene-vinyl acetate copolymer; polyvinylpyrrolidone; maleic anhydride or a copolymer thereof; and an acrylic ester copolymer. Note that, in the present invention, it is preferred to use polyvinyl alcohol as a binder, and also preferred to use polyvinyl alcohol in combination with other binders known in the art.

The content of the binder is preferably 3 to 50% by mass based on the inorganic pigment.

To the pigment dispersion of the present invention, other additives may be added as needed. Examples of the other additives may include a cross-linking agent, a thickener, a pH conditioner, a lubricant, a flowability-modifier, a surfactant, a defoaming agent, a mold lubricant, a fluorescent whitening agent, an ultraviolet absorber and an oxidant inhibitor.

When the pigment dispersion of the present invention is used as a coating solution for forming an ink-receiving layer of an inkjet recording medium, addition of at least one type of boron compound as a cross-linking agent is extremely effective in forming an ink-receiving layer. Examples of the boron compounds that can be used include ortho-boric acid ($H_3BO_3$), metaboric acid, hypoboric acid and borate. As the borate, water-soluble salts of the aforementioned boric acids are preferred. Specific examples thereof may include salts of alkaline metals such as sodium salts of the boric acid ($Na_2B_4O_7.10H_2O$, $NaBO_2.4H_2O$, etc.), potassium salts ($K_2B_4O_7.5H_2O$, $KBO_2$, etc.); and ammonium salts of boric acid ($NH_4B_4O_9.3H_2O$, $NH_4BO_2$, etc.). In consideration of stability of the pigment dispersion with time and effect of suppressing crack generation, it is preferred to use ortho-boric acid.

The content of the boric acid compound is preferably 1.0 to 15.0% by mass based on the binder in terms of ortho-boric acid. Even in this range, cracks may generate depending upon manufacturing conditions or others. Appropriate control is required. When the content exceeds the aforementioned range, the stability of a pigment dispersion with time may decrease. In other words, since the pigment dispersion is used for a long time during manufacturing an inkjet recording medium, if the content of a boric acid compound is too much, the viscosity of the pigment dispersion may increase and gelatinization may occur. Therefore, in some cases, exchange of a pigment dispersion and cleaning of a coater head are frequently required, and productivity significantly decreases.

Next, the inkjet recording medium of the present invention will be described. The inkjet recording medium of the present invention has an ink-receiving layer which is formed by applying the pigment dispersion as mentioned above to a substrate.

As the substrate, for example, a substrate formed of paper or the like is preferably used, which includes a film, cast-coated paper, baryta paper and resin coated paper (e.g., resin coating film having two surfaces coated with polyolefin). As the film, for example, a transparent thermoplastic resin film can be used. Examples of the transparent thermoplastic resin film may include polyethylene, polypropylene, polyester, polylactic acid, polystyrene, polyacetate, polyvinylchloride, cellulose acetate, polyethylene terephthalate, polymethyl methacrylate and polycarbonate.

Other than the aforementioned ones, unsized paper to which moderate sizing is applied, coat paper and sheet-form material (such as synthetic paper) formed of a film made opaque by filling of an inorganic substance and minute foaming can be used. Alternatively, a sheet formed of glass, metal or the like may be used. Furthermore, to improve adhesion strength between the substrates and the ink-receiving layer, corona discharge treatment and various under-coat treatments can be applied to the surface of the substrates.

Onto such a base, the aforementioned pigment dispersion is applied to form an ink-receiving layer. In view of high absorption of ink, the coating amount (dry weight) of the pigment dispersion is preferably 30 $g/m^2$ or more, and preferably 60 $g/m^2$ or less. When the coating amount (dry weight) is less than 30 $g/m^2$, sufficient ink absorption may not be obtained particularly when a recording medium having the resultant ink-receiving layer is used in a printer using a black ink and a plurality of light color inks in addition to three color inks of cyan, magenta and yellow. In other words, ink may sometimes spills and causes bleeding. On the other hand, when the coating amount (dry weight) exceeds 60 $g/m^2$, there may be a risk that cracks are not prevented completely. Note that when the coating amount (dry weight) is 30 $g/m^2$ or more, an ink-receiving layer which can sufficiently absorb an ink even under an environment of high temperature and high humidity can be obtained, whereas, when the coating amount (dry weight) is 60 $g/m^2$ or less, the coating unevenness of ink-receiving layer is less likely to occur and an ink-receiving layer having a stable thickness can be formed.

To attain the object and effect of such as high ink absorption property and high fixability, the ink-receiving layer may preferably have physical properties of the pores satisfying the following conditions. The pore volume of the ink-receiving layer is preferably 0.1 to 1.0 ml/g. That is, when the pore volume does not satisfy the aforementioned range, sufficient ink absorption performance cannot be obtained. The ink-receiving layer becomes poor in ink absorption. Sometimes, ink may spill and bleeding on images may occur. On the other hand, when the pore volume exceeds the aforementioned range, cracks and dusting (falling of powder) tend to easily occur in the ink-receiving layer. Furthermore, the BET specific surface area of the ink-receiving layer is preferably 20 to 450 $m^2/g$. When the BET specific surface area is not within the above range, sufficient glossiness may not be obtained in some cases. In addition, haze increases (transparency decreases). Therefore, there is a risk that a "white hazy" image produces. Further, in this case, the adsorption of the dye in ink may decrease. On the other hand, when the BET specific surface area exceeds the above range, the ink-receiving layer easily cracks.

EXAMPLES

The present invention will be more specifically described by way of Examples and Comparative Examples below; however, the invention is not limited to these.

Preparation Example for Base

A substrate was prepared as follows. First, paper stuff was prepared according to the following composition:

| | |
|---|---|
| Pulp slurry | 100 parts by mass |
| (a mixture of 80 parts by mass of exposed broad-leaved tree kraft pulp (LBKP) having a freeness of 450 ml CSF (Canadian Standard Freeness) and 20 parts by mass of exposed needle-leaved tree kraft pulp (NBKP) having a freeness of 480 ml CSF) | |
| Cationized starch | 0.60 parts by mass |
| Heavy calcium carbonate | 10 parts by mass |
| Light calcium carbonate | 15 parts by mass |
| Alkylketene dimer | 0.10 parts by mass |
| Cationic polyacrylamide | 0.030 parts by mass |

Next, the paper stuff was subjected to a Fourdrinier machine to make sheet. After three-step wet press was applied, the sheet was dried with a multi-cylinder dryer. Thereafter, the sheet was impregnated with an aqueous oxidized starch solution by a size press machine such that a solid content is 1.0 $g/m^2$ and dried. After that, the sheet was subjected to a machine calendaring process for finishing to obtain a base paper A having a basis weight of 170 $g/m^2$, a Stockigt sizing degree of 100 seconds, a gas permeability rate of 50 seconds, a Beck smoothness of 30 seconds and a Gurley stiffness of 11.0 mN.

Onto the base paper A, a resin composition consisting of low-density polyethylene (70 parts by mass), high-density polyethylene (20 parts by mass) and titanium oxide (10 parts by mass) was applied in an amount of 25 g/m². Further, to the rear surface, a resin composition consisting of high-density polyethylene (50 parts by mass) and low-density polyethylene (50 parts by mass) was applied in an amount of 25 g/m² to obtain a substrate coated with resin.

Examples

Preparation of Inorganic Pigment 1

Alumina hydrate (60 g, trade name: Disperal HP14 manufactured by Sasol) as an inorganic pigment and pure water (800 g) were mixed. To the mixture, 0.71 g of magnesium hydroxide was added. Note that the alumina hydrate used herein has a pseudo boehmitestructure, and has a BET specific surface area of 180 m²/g and an average primary particle diameter of 14 nm. The dispersion obtained was placed in an autoclave having an inner volume of 1 L and hydrothermal treatment was performed under the conditions: a temperature of 200° C. for 24 hours while stirring at a rotation number of 50 rpm. The content was cooled and taken out, dried by a spray-dry method to obtain alumina hydrate (inorganic pigment 1) which magnesium adheres to. The drying temperature (gas-phase temperature) was set at 170° C. It was confirmed by inductively coupled plasma-optical emission spectrometry (ICP-OES) that the atomic number ratio (Mg/Al) of magnesium element to aluminum element in inorganic pigment 1 obtained was 0.011. Acid function of inorganic pigment 1 was evaluated by a temperature-programmed desorption test (TPD measurement) using ammonia gas. As a result, it was confirmed that the acid function decreased compared to alumina hydrate which magnesium does not adhere to.

(Preparation of Inorganic Pigment 2)

Alumina hydrate (60 g, trade name: Disperal HP14 manufactured by Sasol) as an inorganic pigment and pure water (800 g) were mixed. To the mixture, 0.71 g of calcium acetate monohydrate was added. To the obtained dispersion mixture, 0.1 N ammonia water was added dropwise so as to obtain pH of about 8. After the neutralization, the mixture was washed. Washing is performed by mixing the solid content and pure water (1 L), centrifugally separating the mixture into a solid content and liquid and recovering the solid content. Washing was performed three times in total. The solid content was further dispersed in pure water and dried by a spray-dry method to obtain alumina hydrate (inorganic pigment 2) which calcium hydroxide adheres to. The drying temperature (gas-phase temperature) was set at 170° C. It was confirmed by inductively coupled plasma-optical emission spectrometry (ICP-OES) that the atomic number ratio (Ca/Al) of calcium element to aluminum element in inorganic pigment 2 obtained was 0.004. Acid function of inorganic pigment 2 was evaluated by a temperature-programmed desorption test (TPD measurement) using ammonia gas. As a result, it was confirmed that the acid function decreased compared to alumina hydrate which calcium does not adhere to.

(Preparation of Inorganic Pigment 3)

Alumina hydrate (60 g, trade name: Disperal HP14 manufactured by Sasol) as an inorganic pigment and pure water (800 g) were mixed. To the mixture, 2.75 g of magnesium acetate 4-hydrate was added. The obtained dispersion mixture was dried by a spray-dry method. The drying temperature (gas-phase temperature) was set at 170° C. The dried powder was mixed with pure water (1 L), and the mixture was centrifugally separated into a solid content and liquid and then the solid content was recovered. In this manner, washing was performed three times in total to obtain alumina hydrate (inorganic pigment 3) which magnesium acetate adheres to. It was confirmed by inductively coupled plasma-optical emission spectrometry (ICP-OES) that the atomic number ratio (Mg/Al) of magnesium element to aluminum element in inorganic pigment 3 obtained was 0.003. Acid function of inorganic pigment 3 was evaluated by a temperature-programmed desorption test (TPD measurement) using ammonia gas. As a result, it was confirmed that the acid function decreased compared to alumina hydrate which magnesium does not adhere to.

(Preparation of Inorganic Pigment 4)

Alumina hydrate (60 g, trade name: Disperal HP14 manufactured by Sasol) as an inorganic pigment and pure water (800 g) were mixed. To the mixture, 0.7 g of magnesium acetate 4-hydrate was added. The obtained dispersion mixture was dried by a spray-dry method to obtain alumina hydrate (inorganic pigment 4) which magnesium acetate adheres to. The drying temperature (gas-phase temperature) was set at 170° C. It was confirmed by inductively coupled plasma-optical emission spectrometry (ICP-OES) that the atomic number ratio (Mg/Al) of magnesium element to aluminum element in inorganic pigment 4 obtained was 0.003. Acid function of inorganic pigment 4 was evaluated by a temperature-programmed desorption test (TPD measurement) using ammonia gas. As a result, it was confirmed that the acid function decreased compared to alumina hydrate which magnesium does not adhere to.

(Preparation of Inorganic Pigments 5 to 7)

Inorganic pigments 5 to 7 were prepared in the same manner as in inorganic pigment 3 except that 1 g of strontium acetate 0.5-hydrate, 10 g of lanthanum acetate 1.5-hydrate, and 15 g of zirconium oxychloride 8-hydrate were respectively used in place of 2.75 g magnesium acetate 4-hydrate. It was confirmed by inductively coupled plasma-optical emission spectrometry (ICP-OES) that the atomic number ratios of strontium, lanthanum and zirconium elements to aluminum element in inorganic pigments 5 to 7 obtained were respectively 0.005, 0.022 and 0.046. Acid function of inorganic pigments 5 to 7 was evaluated by a temperature-programmed desorption test (TPD measurement) using ammonia gas. As a result, it was confirmed that the acid function decreased compared to alumina hydrate which any one of the metals does not adhere to.

(Preparation of Inorganic Pigment 8)

Inorganic pigment 8 was prepared in the same manner as in inorganic pigment 3 except that fumed silica (trade name: Aerosil 380 manufactured by Nippon Aerosil Co., Ltd.) was used in place of alumina hydrate serving as an inorganic pigment and 1.28 g of barium acetate was used in place of 2.75 g of magnesium acetate 4-hydrate. Note that the BET specific surface area of the fumed silica was 380 m²/g, an average primary particle diameter thereof was 7 nm. It was confirmed by inductively coupled plasma-optical emission spectrometry (ICP-OES) that the atomic number ratio (Ba/Si) of barium element to silica element in inorganic pigment 8 obtained was 0.005.

Acid function of inorganic pigment 8 was evaluated by a temperature-programmed desorption test (TPD measurement) using ammonia gas. As a result, it was confirmed that the acid function decreased compared to fumed silica which magnesium does not adhere to.

(Preparation of Inorganic Pigment 9)

Inorganic pigment 9 was prepared in the same manner as in inorganic pigment 4 except that the addition amount of magnesium acetate 4-hydrate was changed to 4 g. It was confirmed by inductively coupled plasma-optical emission spectrometry (ICP-OES) that the atomic number ratio (Mg/Al) of magnesium element to alumina elements in inorganic pigment 9 obtained was 0.019. Acid function of inorganic pigment 9 was evaluated by a temperature-programmed desorption test (TPD measurement) using ammonia gas. As a result, it was confirmed that the acid function decreased compared to alumina hydrate which magnesium does not adhere to.

(Preparation of Inorganic Pigment 10)

Inorganic pigment 10 was prepared in the same manner as in inorganic pigment 4 except that the addition amount of magnesium acetate 4-hydrate was changed to 5.5 g. It was confirmed by inductively coupled plasma-optical emission spectrometry (ICP-OES) that the atomic number ratio (Mg/Al) of magnesium element to alumina elements in inorganic pigment 10 obtained was 0.026. Acid function of inorganic pigment 10 was evaluated by a temperature-programmed desorption test (TPD measurement) using ammonia gas. As a result, it was confirmed that the acid function decreased compared to alumina hydrate which magnesium does not adhere to.

(Preparation of Pigment Dispersion 1)

First, inorganic pigment 1 was added to pure water so as to obtain a concentration of 23% by mass in terms of alumina hydrate. Furthermore, acetic acid was added in a concentration of 2.0% by mass based on the alumina hydrate and stirred to obtain pigment dispersion 1.

(Preparation of pigment dispersions 2 to 7, 9 and 10)

Pigment dispersions 2 to 7, 9 and 10 were prepared using inorganic pigment 2 to 7, 9 and 10 in the same manner as in pigment dispersion 1.

(Preparation of Pigment Dispersion 8)

First, inorganic pigment 8 was added to pure water so as to obtain a concentration of 10% by mass in terms of fumed silica. Furthermore, a dimethyldiallylammonium chloride homopolymer (trade name: Sharoll DC902P, manufactured by Dai-ichi Kogyo Seiyaku Co., Ltd.) was added in a concentration of 4.0% by mass based on the solid content of the fumed silica and dispersed by a hyperbaric homogenizer to prepare pigment dispersion 8.

(Preparation of Pigment Dispersion 11)

Pigment dispersion 11 was prepared in the same manner as in pigment dispersion 1 except that alumina hydrate (trade name: Disperal HP14 manufactured by Sasol) was used as an inorganic pigment in place of inorganic pigment 1.

(Preparation of Pigment Dispersion 12)

Pigment dispersion 12 was prepared in the same manner as in pigment dispersion 8 except that fumed silica (trade name: Aerosil 380 manufactured by Nippon Aerosil Co., Ltd.) was used as an inorganic pigment in place of inorganic pigment 8.

<Evaluation of Pigment Dispersion>

1) Concentration of Metal Ions Present in Pigment Dispersion

The amount of metal ions present in pigment dispersions 1 to 10 were checked by inductively coupled plasma-optical emission spectrometry (ICP-OES). Note that the amount of metal ions was analyzed as follows. The pigment dispersion was centrifugally separated into solid and liquid and the amount of metal ions in the liquid was analyzed by inductively coupled plasma-optical emission spectrometry (ICP-OES). The results were summarized in Table 1.

2) Viscosity

Viscosity of pigment dispersions 1 to 12 was measured by a viscometer (trade name: PB80 type viscometer manufactured by Toki Sangyo Co., Ltd.) at an ambient temperature of 25° C. The results were summarized in Table 1.

3) Average Diameter of Dispersed Particles

The average diameter of dispersed particles was determined by diluting pigment dispersions 1 to 12 with pure water so as to obtain a solid concentration of 0.5% by mass, and subjecting the diluted solutions to analysis carried out by concentrated-system particle diameter analyzer (trade name FPAR-3000 manufactured by Otsuka Electronics Co., Ltd) at an ambient temperature of 25° C. The results were summarized in Table 1.

TABLE 1

|  | Inorganic pigment | Modification method | Metal compound | Concentration (mol/L) | Viscosity (mPa·s) | Diameter of dispersed particles (nm) |
|---|---|---|---|---|---|---|
| Pigment dispersion 1 | Alumina hydrate | Hydrothermal synthesis | Magnesium hydroxide | 0.02 | 15 | 141 |
| Pigment dispersion 2 | Alumina hydrate | Neutralization method | Calcium acetate monohydrate | 0.01 | 22 | 146 |
| Pigment dispersion 3 | Alumina hydrate | Spray-dry method | Magnesium acetate 4-hydrate | 0.006 | 18 | 139 |
| Pigment dispersion 4 | Alumina hydrate | Spray-dry method | Magnesium acetate 4-hydrate | 0.006 | 20 | 142 |
| Pigment dispersion 5 | Alumina hydrate | Spray-dry method | Strontium acetate 0.5-hydrate | 0.01 | 14 | 141 |
| Pigment dispersion 6 | Alumina hydrate | Spray-dry method | Lanthanum acetate 1.5-hydrate | 0.04 | 10 | 144 |
| Pigment dispersion 7 | Alumina hydrate | Spray-dry method | Zirconium oxychloride 8-hydrate | 0.04 | 9 | 140 |
| Pigment dispersion 8 | Fumed silica | Spray-dry method | Barium acetate | 0.004 | 46 | 135 |
| Pigment dispersion 9 | Alumina hydrate | Spray-dry method | Magnesium acetate 4-hydrate | 0.06 | 620 | 285 |
| Pigment dispersion 10 | Alumina hydrate | Spray-dry method | Magnesium acetate 4-hydrate | 0.1 | 1234 | 610 |
| Pigment dispersion 11 | Alumina hydrate | — | — | — | 10 | 140 |
| Pigment dispersion 12 | Fumed silica | — | — | — | 45 | 135 |

From Table 1, pigment dispersions 1 to 8, which contain an inorganic pigment which a metal compound adheres to and dissolve metal ions in a concentration of not more than 0.05 mol/L, all had a viscosity of 50 mPa·s or less and an average diameter of dispersed particles of 150 nm or less. These results were the same as those in pigment dispersions 11 and 12, which contain an inorganic pigment which a metal compound does not adhere to. In contrast, in pigment dispersions 9 and 10, which dissolve metal ions in a concentration of more than 0.05 mol/L, inorganic pigments coagulate strongly. As a result, the average diameter of dispersion particles increases and viscosity increases. Furthermore, in pigment dispersion 10, since it was gelatinized, it was difficult to apply it to a substrate to prepare an inkjet recording medium.

Examples 1 to 7

Preparation of Inkjet Recording Mediums 1 to 7

Polyvinyl alcohol (trade name: PVA235 manufactured by Kuraray Co., Ltd, polymerization degree: 3500, saponification degree: 88%) was dissolved in ion exchange water to obtain an aqueous PVA solution having a solid content of 8.0% by mass. To pigment dispersions 1 to 7, the PVA solution prepared above was mixed so as to obtain a concentration of 10% by mass in terms of PVA solid content based on the solid content of alumina hydrate. Furthermore, 3.0% by mass of an aqueous boric acid solution was added so as to obtain a concentration of 1.7% by mass in terms of boric acid solid content based on the solid content of alumina hydrate to prepare pigment dispersions. The obtained pigment dispersions each were applied to a substrate by a die coater so as to obtain a coating amount (dry weight) of 35 g/m$^2$ to prepare inkjet recording mediums 1 to 7 of Examples 1 to 7.

Example 8 preparation of Inkjet Recording Medium 8

Polyvinyl alcohol (trade name: PVA235 manufactured by Kuraray Co., Ltd, polymerization degree: 3500, saponification degree: 88%) was dissolved in ion exchange water to obtain an aqueous PVA solution having a solid content of 8.0% by mass. To pigment dispersion 8, the PVA solution prepared above was mixed so as to obtain a concentration of 20% by mass in terms of PVA solid content based on the solid content of fumed silica. Furthermore, 3.0% by mass of an aqueous boric acid solution was added so as to obtain a concentration of 6.0% by mass in terms of boric acid solid content based on the solid content of fumed silica to prepare a pigment dispersion. The obtained pigment dispersion was applied to a substrate by a die coater so as to obtain a coating amount (dry weight) of 35 g/m$^2$ to prepare inkjet recording medium 8 of Example 8.

Comparative Example 1

Preparation of Inkjet Recording Medium 9

The inkjet recording medium 9 of Comparative Example 1 was prepared in the same manner as in inkjet recording medium 1 except that pigment dispersion 11 was used in place of pigment dispersion 1.

Comparative Example 2

Preparation of Inkjet Recording Medium 10

The inkjet recording medium 10 of Comparative Example 2 was prepared in the same manner as in inkjet recording medium 8 except that pigment dispersion 12 was used in place of pigment dispersion 8.

Comparative Example 3

Preparation of Inkjet Recording Medium 11

An inkjet recording medium was prepared by adding magnesium hydroxide to a pigment dispersion alumina hydrate.

First, alumina hydrate (trade mane: Disperal HP14 manufactured by Sasol) was added to pure water so as to obtain a concentration of 23% by mass. Furthermore, magnesium hydroxide was added so as to obtain an atomic number ratio (Mg/Al) of magnesium element to aluminum element of 0.011 and stirred. Furthermore, acetic acid was added to the alumina hydrate so as to obtain a concentration of 2.0% by mass and stirred to obtain a alumina hydrate dispersion.

Subsequently, polyvinyl alcohol (trade name: PVA235 manufactured by Kuraray Co., Ltd, polymerization degree: 3500, saponification degree: 88%) was dissolved in ion exchange water to obtain an aqueous PVA solution having a solid content of 8.0% by mass. To the alumina hydrate dispersion obtained above, the PVA solution prepared above was mixed so as to obtain a concentration of 10% by mass in terms of PVA solid content based on the solid content of alumina hydrate. Furthermore, 3.0% by mass of an aqueous boric acid solution was added so as to obtain a concentration of 1.7% by mass in terms of boric acid solid content based on the solid content of alumina hydrate to prepare a pigment dispersion.

The obtained pigment dispersion was applied to a substrate by a die coater so as to obtain a coating amount (dry weight) of 35 g/m$^2$ to prepare inkjet recording medium 11 of Comparative Example 3. More specifically, inkjet recording medium 11 is prepared by incorporating a compound hardly-soluble in water into an ink-receiving layer without making the compound adhere to the alumina hydrate.

Comparative Examples 4 and 5

Preparation of Inkjet Recording Mediums 12 and 13

The inkjet recording mediums 12 and 13 of Comparative Examples 4 and 5 were prepared in the same manner as in inkjet recording medium 11 except that calcium acetate monohydrate and strontium acetate 0.5-hydrate were respectively used in place of magnesium hydroxide. Note that the atomic number ratio (Ca/Al) of calcium element to aluminum element in Comparative Example 4 was set at 0.004 and the atomic number ratio (Sr/Al) of strontium element to aluminum element in Comparative Example 5 was set at 0.005. More specifically, the inkjet recording mediums 12 and 13 are obtained by incorporating a water-soluble compound to an ink-receiving layer.

Comparative Example 6

Preparation of Inkjet Recording Medium 14

The inkjet recording medium was prepared by adding barium acetate.

First, fumed silica (trade name: Aerosil 380 manufactured by Nippon Aerosil Co., Ltd.) was added to pure water so as to obtain a concentration of 10% by mass. Furthermore, barium acetate was added so as to obtain an atomic number ratio (Ba/Si) of barium element to silica element of 0.005. Furthermore, a dimethyldiallylammonium chloride homopolymer (trade name: Sharoll DC902P, manufactured by Dai-ichi Kogyo Seiyaku Co., Ltd.) was added so as to obtain a concentration of 4.0% by mass based on the solid content of fumed silica and dispersed by a hyperbaric homogenizer to prepare silica fine particle dispersion.

Subsequently, polyvinyl alcohol (trade name: PVA235 manufactured by Kuraray Co., Ltd, polymerization degree: 3500, saponification degree: 88%) was dissolved in ion exchange water to obtain an aqueous PVA solution having a solid content of 8.0% by mass. The PVA solution prepared above was mixed to the silica fine particle dispersion prepared above so as to obtain a concentration of 20% by mass in terms of PVA solid content based on the fumed silica solid content. Furthermore, an aqueous 3.0% by mass boric acid solution was mixed so as to obtain a concentration of 6.0% by mass in terms of boric acid solid content based on the fumed silica solid content to prepare a pigment dispersion.

The obtained pigment dispersion was applied to a substrate by a die coater so as to obtain a coating amount (dry weight) of 35 g/m$^2$ to prepare inkjet recording medium 14 of Comparative Example 6. More specifically, the inkjet recording medium 14 is obtained by incorporating a water soluble compound into an ink-receiving layer.

Comparative Example 7

Preparation of Inkjet Recording Medium 15

Inkjet recording medium 15 of Comparative Example 7 was prepared in the same manner as in the inkjet recording medium 1 except that the pigment dispersion 9 was used in place of the pigment dispersion 1.

<Evaluation of Inkjet Recording Mediums>

Inkjet recording mediums 1 to 15 prepared in Examples 1 to 8 and Comparative Examples 1 to 7 were checked for two items: 4) storage stability of printed image (gas resistance and light resistance) and 5) optical density. The evaluation results obtained are summarized in Table 2.

4) Storage Stability of Printed Image
(Preparation of Printed Matter)

To the printing surface of each of the inkjet recording mediums 1 to 15 prepared in Examples and Comparative Examples above, single color patches of black, cyan, magenta and yellow were printed so as to achieve a optical density (OD) of about 1.0 for each color, thereby obtaining a printed matter. Note that printing was made by use of a photo printer (trade name: PIXUS IP8600, Ink: BCI-7, manufactured by Canon Inc.) using an inkjet system.

(Gas Resistance Test)

The above printed matters were subjected to an ozone exposure test using an ozone weatherometer (type: OMS-HS manufactured by Suga Test Instruments Co., Ltd.).

Test Conditions:
Composition of exposure gas: Ozone 10 ppm
Test time: 8 hours
Temperature/humidity conditions of test vessel: 23° C., 50% RH Evaluation Method of Ozone Resistance:

The optical density of a printed matter was measured by a spectrophotometer (trade name: Spectrolino manufactured by GretagMacbeth) before and after the test and the density residual ratio was obtained based on the following equation:

Density residual ratio(%)=(optical density after test/optical density before test)×100.

<Evaluation Standard>

A Cyan density residual ratio: 80% or more
B Cyan density residual ratio: 60% or more and less than 80%.
C Cyan density residual ratio: less than 60%

(Light Resistance Test)

The above printed matters were subjected to a xenon exposure test using a xenon feather meter (type: XL-750 manufactured by Suga Test Instruments Co., Ltd.).

Test Conditions
Accumulated radiation: 40000KLX
Temperature/humidity conditions of test vessel 23° C., 50% RH Evaluation Method of Xenon Resistance:

The optical density of the above printed matter was measured by a spectrophotometer (trade name: Spectrolino manufactured by GretagMacbeth) before and after the test and the density residual ratio was obtained based on the following equation:

Density residual ratio(%)=(optical density after test/optical density before test)×100.

<Evaluation Standard>

A Cyan density residual ratio: 80% or more
B Cyan density residual ratio: 60% or more and less than 80%.
C Cyan density residual ratio: less than 60%

5) Optical Density

A solid image of black ink was printed on the printing surface of inkjet recording mediums 1 to 15 prepared in Examples and Comparative Examples above by use of a photo printer (trade name: PIXUS IP8600, Ink: BCI-7, manufactured by Canon Inc.) using an inkjet system. Thereafter, the reflection density of a black-printed part was measured by 310TR (trade name) manufactured by X-Rite.

TABLE 2

| | Inorganic pigment | Modification method | Metal compound | Gas resistance | Light resistance | Optical density |
|---|---|---|---|---|---|---|
| Ex. 1 | Alumina hydrate | Hydrothermal synthesis | Magnesium hydroxide | A | A | 2.4 |
| Ex. 2 | Alumina hydrate | Neutralization method | Calcium acetate monohydrate | A | A | 2.4 |
| Ex. 3 | Alumina hydrate | Spray-dry method | Magnesium acetate 4-hydrate | A | A | 2.4 |
| Ex. 4 | Alumina hydrate | Spray-dry method | Magnesium acetate 4-hydrate | A | A | 2.4 |
| Ex. 5 | Alumina hydrate | Spray-dry method | Strontium acetate 0.5-hydrate | A | A | 2.4 |
| Ex. 6 | Alumina hydrate | Spray-dry method | Lanthanum acetate 1.5-hydrate | A | B | 2.4 |
| Ex. 7 | Alumina hydrate | Spray-dry method | Zirconium oxychloride 8-hydrate | A | B | 2.4 |
| Ex. 8 | Fumed silica | Spray-dry method | Barium acetate | A | A | 2.4 |
| Com. Ex. 1 | Alumina hydrate | — | — | C | C | 2.4 |
| Com. Ex. 2 | Fumed silica | — | — | C | C | 2.4 |
| Com. Ex. 3 | Alumina hydrate | Added to pigment dispersion | Magnesium hydroxide | B | B | 2.1 |
| Com. Ex. 4 | Alumina hydrate | Added to pigment dispersion | Calcium acetate monohydrate | B | B | 2.1 |
| Com. Ex. 5 | Alumina hydrate | Added to pigment dispersion | Strontium acetate 0.5-hydrate | B | B | 2.2 |
| Com. Ex. 6 | Fumed silica | Added to pigment dispersion | Barium acetate | B | B | 2.2 |
| Com. Ex. 7 | Alumina hydrate | Spray-dry method | Magnesium acetate 4-hydrate | A | A | 2.2 |

From the results of Table 2, it was found that the recording mediums of Examples 1 to 8 using the inorganic pigment which a metal compound including Mg, Ca, Sr, Ba, La or Zr adheres to had good gas resistance and light resistance and the equivalent optical density, compared to those of Comparative Examples 1 and 2 using the inorganic pigment which the metal compound does not adhere to. Note that the concentration of metal ions dissolved in a pigment dispersion applied onto a substrate according to Examples 1 to 8 was 0.05 mol/L or less.

On the other hand, in Comparative Example 3 where a compound hardly-soluble in water was added to an ink-receiving layer without making the compound adhere to the alumina hydrate and in Comparative Examples 4 to 6 where a water soluble compound was added to an ink-receiving layer, it was confirmed that the recording mediums showed gas resistance and light resistance, but the properties were found insufficient and the optical density was low.

Furthermore, in Comparative Example 7 where a pigment dispersion containing the inorganic pigment which a metal compound including Mg adheres to and dissolving metal ions in a concentration exceeding 0.05 mol/L, it was confirmed that the recording medium had gas resistance and light resistance and the optical density was low.

From the foregoing, it was found that a recording medium having a high optical density and excellent gas resistance and light resistance can be obtained by use of a pigment dispersion containing an inorganic pigment which a metal compound adheres to and containing metal ions in a concentration of 0.05 mol/L or less. In particular, it was found that a recording medium having excellent gas resistance and light resistance can be obtained by allowing an inorganic pigment which a metal compound containing at least one element selected from the group of Mg, Ca, Sr and Ba adheres to.

Note that evaluation of gas resistance and light resistance shown in Table 2 was performed with respect to cyan. However, in the cases of black, magenta and yellow ink, it was confirmed that those of the recording medium of Examples 1 to 7 are improved compared to those of Comparative Example 1 to 7 as in the case of cyan.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2007-340899, filed Dec. 28, 2007, which is hereby incorporated by reference herein in its entirety.

The invention claimed is:

1. An inkjet recording medium comprising an ink-receiving layer, the ink-receiving layer being formed by applying a pigment dispersion to a substrate,
wherein the pigment dispersion contains an inorganic pigment dispersed therein, a binder, and a metal compound that adheres to the inorganic pigment, such that the concentration of a metal ion of the metal compound that is dissolved in the pigment dispersion does not exceed 0.05 mol/L, and
wherein the inorganic pigment to which the metal compound is adhered is obtained by at least one process selected from the group consisting of manufacturing processes (1) to (3):
(1) a manufacturing process having a hydrothermal synthesis treatment of inorganic pigment performed in the presence of the metal compound under the conditions of a temperature of from 100° C. or more to less than 350° C.;
(2) a manufacturing process having a step of mixing a slurry of a dispersion of inorganic pigment and the metal compound with a stirrer and a step of drying the mixed slurry by a spray-dry method at 100 to 300° C.; and
(3) a manufacturing process having a step of adding a metal compound solution to an inorganic pigment dispersion and stirring and a step of adding an alkali dispersion to neutralize.

2. An inkjet recording medium according to claim 1, wherein the inorganic pigment to which the metal compound is adhered is an inorganic pigment obtained by a manufacturing process having a step of mixing a slurry of a dispersion of inorganic pigment and the metal compound with a stirrer and a step of drying the mixed slurry by a spray-dry method at 100 to 300° C.

3. An inkjet recording medium according to claim 1, wherein the metal compound in the inorganic pigment is a compound containing at least one element selected from the group consisting of Mg, Ca, Sr and Ba.

4. An inkjet recording medium according to claim 1, wherein the inorganic pigment is alumina hydrate.

5. An inkjet recording medium according to claim 1, wherein a metal element (A) constituting the inorganic pigment and a metal element (B) constituting the metal compound in the inorganic pigment are at an atomic number ratio (B/A) of 0.003 to 0.05.

6. An inkjet recording medium according to claim 1, wherein the inorganic pigment to which the metal compound adheres is an inorganic pigment showing acid function which is decreased by the metal compound.

* * * * *